United States Patent Office 3,518,235
Patented June 30, 1970

3,518,235
CROSSLINKABLE AROMATIC SULFONE POLYMERS
Saul M. Cohen, Springfield, and Raymond H. Young, Jr., East Longmeadow, Mass., assignors to Monsanto Company, St. Louis, Mo., a corporation of Delaware
No Drawing. Filed Nov. 10, 1966, Ser. No. 593,285
Int. Cl. C08g 23/00
U.S. Cl. 260—79.3                                                     4 Claims

ABSTRACT OF THE DISCLOSURE

This application relates to novel aromatic sulfone polymers which have a high degree of thermal stability and are capable of crosslinking to form a reticulate polymeric structure. The crosslinking functional group may be generally represented by the following structure:

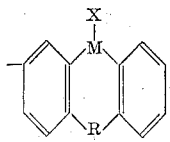

wherein M is a metal, X is a halogen and R is a divalent radical.

---

The various currently available sulfone type polymers described in the patent literature, such as U.S. Pats. 3,153,021, 3,234,189, 3,234,190, and 3,220,984, are deficient in that they have poor high temperature thermal stability and tend to show degradation after exposure to temperatures of 200–300° C. for short periods of time. This instability is due to the aliphatic groups in the polymer which are both very susceptible to high temperature oxidative degradation and also are subject to reversible equilibrium which evolves sulfur dioxide at elevated temperatures.

The available aromatic sulfone polymers, while having improved thermal stability over those discussed above, have other drawbacks such as being available only as low-yield, low-molecular weight products. Furthermore, substituents in the aromatic portions of these polymers are either aliphatic groups which tend to lessen thermal stability or they are of a nature to introduce ring substitution which in turn will cause a decrease in oxidative thermal stability. Moreover, these sulfone polymers may lack the necessary solvent resistance to enable them to be used in certain critical applications where the solubility of the polymer is a problem.

Attempts to improve the solubility of the currently available aromatic sulfone polymers by introducing crosslinking groups into the polymer have created more problems than they have solved. Most available crosslinking groups such as carboxyl, hydroxyl, isocyanate, etc. are sources of degradation at the elevated temperatures where thermally stable polymers are intended to be used. Furthermore, such groups increase the sensitivity of the aromatic rings with which they are associated and make these rings susceptible to attack and degradation by oxygen.

A definite need exists for aromatic sulfone polymers which can operate in the 200–300° C. range and which are stable in a variety of corrosive environments. A further need exists for such materials which are available in large yields having a substantial molecular weight. A further need exists for aromatic sulfone polymers which are capable of crosslinking to form a reticulate polymer structure which will operate in the 200–300° C. range. The need for polymers of this type is especially urgent in the surface coating and electrical insulation areas.

Therefore, it is an object of this invention to provide crosslinkable aromatic sulfone polymers which are resistant to oxidative degradation at 200–300° C.

It is another object of this invention to provide crosslinked aromatic sulfone polymers.

It is another object of this invention to provide a process for the preparation of aromatic sulfone polymers.

These and other objects are obtained by a polymer comprising recurring units of the following general structure:

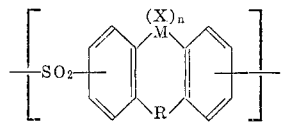

wherein R is a bivalent radical selected from the group consisting of oxygen, sulfur, monoalkyl phosphine, selenium and —Si($R_1$)$_2$—, wherein $R_1$ is alkyl of from 1 to 3 carbons and wherein M is a metal selected from the group consisting of aluminum, iron (III), phosphorous (III), boron and tin (IV); wherein X is a halogen and $n$ is an integer from 1 to 2.

The following examples are given in illustration of this invention and should not be construed as limitations thereof. All parts and percentages are by weight unless otherwise indicated.

The following Example 1 is set forth as a control to illustrate the criticality of the polymerization temperature in the preparation of crosslinkable sulfone polymers. Example 1 describes the preparation of poly[(4-oxy-p-phenylene)(p-phenylene)sulfone] using a Friedel-Crafts type catalyst. This preparation may be represented by the general equation:

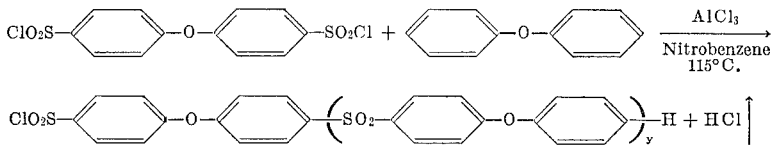

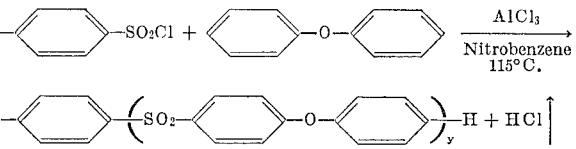

wherein $y$ is an integer of about 55.

EXAMPLE 1

A one liter, 3-necked, round-bottom flask equipped with a Teflon stirrer, dropping funnel and condenser capped with a CaCl$_2$ drying tube is purged with dry nitrogen for 20 minutes. A slurry of 27.4 grams (0.203 mol) of anhydrous AlCl$_3$ in 100 ml. nitrobenzene is charged to the flask followed by a solution of 36.7 grams (0.10 mol) of 4,4'-oxydi(benzenesulfonyl chloride) in 100 ml. nitrobenzene followed by a solution of 17.0 grams (0.10 mol) of diphenyl ether in 100 ml. nitrobenzene, while maintaining stirring and a dry nitrogen purge. Prior to the start of the reaction, the CaCl$_2$ drying tube is replaced by a flexible tube leading to a HCl trap containing aqueous KOH, and phenolphthalein indicator which is used to measure the amount of HCl evolved.

The reaction temperature is raised slowly to 115° C. over a period of 15.5 hours during which time HCl is evolved in a quantity which is 1.24 times the theoretical yield. After this period, destruction of the catalyst is accomplished by addition of 200 ml. of methanol, dropwise, to the viscous reaction mixture followed by stirring at 85° C. for 18 hours. Then 150 ml. of water is added to the polymer mixture, and the methanol and nitrobenzene are steam distilled. By this technique, about one-half to two-thirds of the nitrobenzene is removed. The residue is then refluxed for one hour in ethanol, filtered cold through a Buchner funnel, and the collected polymer redissolved in 800 ml. of dimethylacetamide by heating at 100° C./2 hours.

The hot solution is filtered through a Buchner funnel lined with felt. One-third of the solvent is removed by vacuum distillation, and the polymer is reprecipitated at room temperature by the dropwise addition of 1200 ml. of 1:1 methanol-water. The polymer is collected by filtration through a Buchner funnel, washed twice with methanol, and dried at 130° C. for 18 hours at 50 mm. Yield: 98%.

The polymer, which is recovered in a nearly quantitative yield, has an inherent viscosity of 0.35 dl./g. when measured as a 1% solution in dimethylacetamide at 20° C., which corresponds to a $y$ value of about 55. This polymer has a melting point of 260° C. and excellent oxidative thermal stability as is evidenced by the weight loss of only 4% after 185 hours at 300° C.; and no change in the initial infra-red absorption bands is observed after the heating.

The structure of the foregoing polymer is evidenced by close to the expected elemental analysis and the following infra-red absorption bands:

| Wavelength (microns: | Group |
|---|---|
| 3.31 | Aromatic C—H stretch. |
| 6.39 and 6.79 | Aromatic C=C. |
| 7.61 and 7.75 | Antisymmetric $SO_2$ stretch. |
| 8.05 | Aryl ether. |
| 8.69 | Symmetric $SO_2$ stretch. |
| 9.06 | p-Substituted aryl ether. |
| 9.35 and 9.92 | p-Substituted phenyl. |
| 11.49 and 12.03 | C—H out plane deformation on p-substituted aryl ether. |

The inability of this polymer to undergo a crosslinking reaction which would result in an insoluble, reticulate polymer structure is discussed below when this control sample is compared to the other examples which illustrate the novel polymers of this invention.

The following Example 2 is set forth to show the preparation of a crosslinkable aromatic sulfone polymer of comparable structure. This preparation may be generally represented by the following:

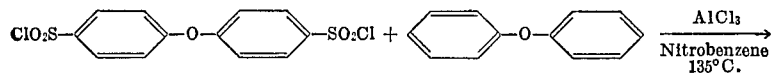
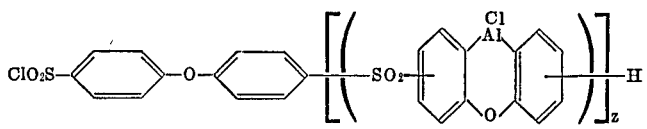

when $z$ is an integer of about 59.

EXAMPLE 2

The apparatus and general procedure of Example 1 are used here except that an excess of aluminum chloride catalyst is used and the reaction is carried out at 135° C. A 1.5 to 1 molar ratio of aluminum chloride to sulfonyl chloride (in the monomeric reactants) is used as compared to the approximately equimolar amounts used in Example 1.

During the reaction 2.75 times the theoretical yield of hydrogen chloride is evolved as compared to that in Example 1 where only 1.24 times the theoretical yield of hydrogen chloride is evolved. In this reaction the chloride moiety is coming from the aluminum chloride catalyst while the hydrogen moiety is coming from the aromatic rings. Thus, the much greater evolution of hydrogen chloride in this example over that of Example 1 evidences the entry of some of the aluminum chloride into the polymer ring structure as the monochloride.

The polymer in this example is recovered as a black organometallic polymer in a yield of 163% of theoretical, which theoretical yield is based on the theoretical polymeric structure of the organic reactants alone. This large increase over the theoretical yield which is attributed to the weight contribution of the aluminum monochloride which is incorporated into the ring structure further indicates that substantially all of the repating units contain aluminum monochloride bound in the ring structure.

After recovery, the polymer is purified according to the procedure of Example 1. A dilute solution of the purified polymer in pyridine is characterized by a red color which is attributed to the chromophoric aluminum monochloride group.

The 2 to 16 micron infrared curve of this polymer is essentially the same as that obtained for the polymer in Example 1, which is to be expected as the C—Al—C structure would not usually show up in the range examined.

The purified polymer has an inherent viscosity of 0.12 dl./g. as measured as a 1% solution in dimethylacetamide at 20° C. However, after acid-catalyzed hydrolysis is carried out, the polymer has an inherent viscosity of 0.38 dl./g. ($z \cong 59$) with no change in the infrared curve. This surprising result is believed to be due to the fact that the polymer containing the aluminum monochloride units behaves as a polyelectrolyte, giving a low viscosity reading. However, when most of the aluminum monochloride group is removed by hydrolysis, the organic polymer structure predominates and the polymer solution behaves more like that in Example 1.

The following Examples 3–4 are set forth to illustrate the time/temperature variations that are possible in the practice of this invention.

EXAMPLE 3

This example is set forth to illustrate the control of reaction conditions to produce a polymer wherein only about 15% of the recurring polymer units contain aluminum monochloride incorporated into the ring structure. This reaction may be illustrated by the following general equation:

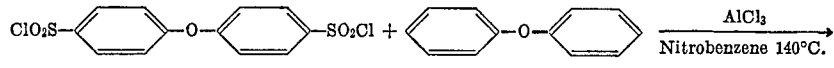
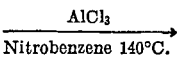
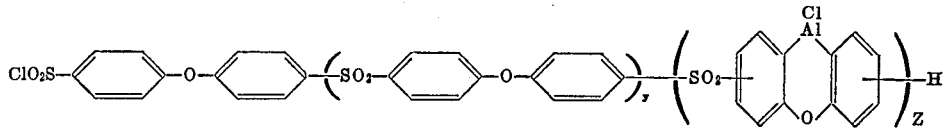

wherein the ratio of $y/z$ is about 17/3.

In this reaction the general procedures of Example 2 are followed except that a 1.4 to 1 molar ratio of catalyst to sulfonyl chloride groups is used and the reaction temperature is maintained at 140° C. for 6 hours. The polymer is comparable to that obtained in Example 2 except that only about 15% of the of the recurring polymer units contain aluminum monochloride.

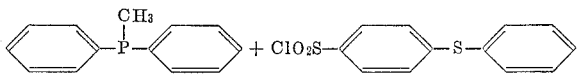

EXAMPLE 4

This example is set forth to illustrate the control of reaction conditions to produce a polymer wherein only about 3% of the recurring polymer units contain aluminum monochloride incorporated into the ring structure.

In this reaction the general procedures of Example 2 are followed except that a 1.1 to 1 molar ratio of catalyst to sulfonyl chloride groups is used and the reaction temperature is maintained at 130° C. for 8 hours.

The polymer is comparable to that obtained in Example 2 except that only about 3% of the recurring polymer units contain aluminum monochloride.

EXAMPLE 5

This example is set forth to illustrate the control of reaction conditions to produce a polymer wherein only about 35% of the recurring polymer units contain aluminum monochloride incorporated into the ring structure.

In this reaction the general procedures of Example 2 are followed except that a 1.5 to 1 molar ratio of catalyst to sulfonyl chloride groups is used and the reaction temperature is maintained at 150° C. for 6 hours.

The polymer is comparable to that obtained in Example 2 except that only about 35% of the recurring polymer units contain aluminum monochloride.

EXAMPLE 6

This example is set forth to illustrate the control of reaction conditions to produce a polymer wherein only about 50% of the recurring polymer units contain aluminum monochloride incorporated into the ring structure.

In this reaction the general procedures of Example 2 are followed except that a 1.7 molar ratio of catalyst to sulfonyl chloride groups is used and the reaction temperature is maintained at 160° C. for 6 hours.

The polymer is comparable to that obtained in Example 2 except that only about 50% of the recurring polymer units contain aluminum monochloride.

EXAMPLE 7

This example is set forth to illustrate the use of di-phenylsulfide and a ferric chloride-aluminum chloride co-catalyst system in the preparation of the crosslinkable polymers of this invention. The general procedure of Example 2 is carried out here except that 0.5 mole of ferric chloride and 1.0 mole of aluminum chloride is used per mole of sulfonyl chloride group and except that a reaction temperature of 150° C. is used. The properties of the resulting polymer are comparable to those found in the polymer prepared in Example 2. The general reaction of this example may be represented by the following general formula:

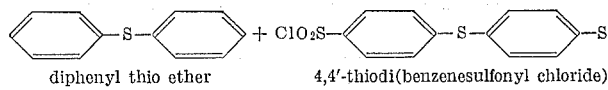

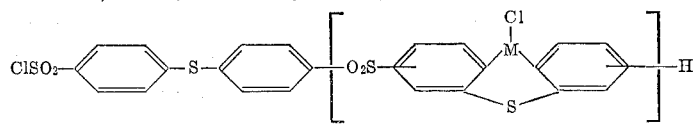

wherein M is aluminum and iron.

EXAMPLE 8

This example is set forth to illustrate the use of a diphenyl methyl phosphine and an aluminum chloride/stannic chloride (2/1) co-catalyst system in the practice of this invention. In this example the general reaction is represented by the following general formula:

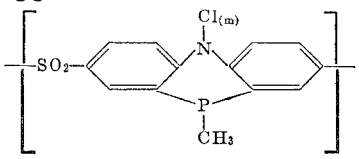

wherein M is tin and aluminum and $m$ is an integer from 1 to 2.

This polymer is prepared according to the general procedures of Example 2 except for the monomer, catalyst and temperature variations. The properties of this polymer are comparable to those found in the polymer prepared in Example 2.

EXAMPLE 9

This example illustrates the use of diphenyl dimethyl silane and a phosphorous trichloride-aluminum chloride (2/1) co-catalyst system.

The polymer which is prepared according to the general teachings of Example 2 except for the co-catalyst system has properties comparable to the polymer prepared in that example.

EXAMPLE 10

The general procedure of Example 2 is followed here except that a diphenyl selenide monomer is used in conjunction with a ferric chloride-aluminum chloride catalyst system instead of the diphenyl ether monomer and aluminum chloride catalyst used in Example 2. The polymer obtained is comparable to that produced in Example 2.

The polymers prepared in the foregoing Examples 1 to 4 and 7 are tested for crosslinkability according to the following general procedure. 10% solutions of the respective polymers in dimethylacetamide are prepared and polymer films are cast from these solutions onto steel plates. The dried films, which are approximately 5 mil thick, are heated for varying periods of time after which the solubility of the coating is tested by suspending the coated steel plates in refluxing dimethylacetamide.

The test results on these samples are tabulated in the following table:

TABLE I.—SOLUBILITY TESTS ON EXAMPLES 1-4 AND 7

| Example | Temperature, ° C. | Time | Solubility |
| --- | --- | --- | --- |
| 1 (control) | 300 | 67 hours | Soluble. |
| 2 | 200 | 9 hours | Do. |
| 2 | 250 | 1.5 hours | Insoluble. |
| 2 | 300 | 10 minutes | Do. |
| 3 | 300 | 10 minutes | Do. |
| 4 | 300 | 50 minutes | Do. |
| 7 | 300 | 10 minutes | Do. |

The data in the foregoing table illustrates that the polymer of Example 1 which was prepared at temperatures of 115° C. or below and using a stoichiometric amount of catalyst for the sulfonyl chloride groups does not undergo any crosslinking which renders the polymer insoluble even up to conditions of 300° C./67 hrs.

On the other hand, the polymers prepared in Examples 2 to 4 and 7 are insoluble in refluxing dimethylacetamide after curing for appropriate lengths of time at temperatures above 200° C. These polymers which are capable of crosslinking to form insoluble products are prepared using an excess of catalyst and reaction temperatures in the 120 to 170° C. range. It is believed that the use of these conditions allows the introduction of crosslinkable metal halide groups into the polymer thereby giving surprising unexpected results.

The starting materials to be used in the preparation of polymers of this invention are certain diphenyl-type derivatives and diphenyl disulfonyl halide-type compounds which may be illustrated by the following structural formulae:

(I)
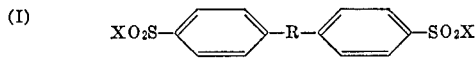

diphenyl disulfonyl halide type (II)
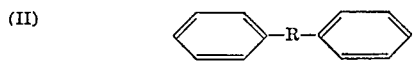

wherein R is a bivalent radical independently selected from the group consisting of oxygen, sulfur, monoalkyl phosphine, selenium, —$Si(R_1)_2$—, wherein $R_1$ is an alkyl of from 1 to 3 carbon atoms. The R groups in the respective monomeric reactants may be the same or different. The preferred polymers are those wherein R is oxygen or sulfur.

The preferred catalyst for the polymerization reactions of this invention is aluminum chloride. Also suitable are co-catalyst systems based on aluminum halides and a Friedel-Crafts type catalyst such as ferric halide, stannic halide, phosphorous halide, boron trihalide, etc. The preferred halide in the catalyst systems is the chloride. It is essential that the molar ratio of catalyst system to sulfonyl halide groups in Formula I above be greater than 1.05 to 1 in order to introduce metal halide groups into the polymer structure. Generally, no advantage is seen in using a molar ratio of catalyst system to sulfonyl halide groups which is greater than 3 to 1.

When using co-catalyst systems the molar ratio of aluminum chloride to the co-catalyst should be in the range of 1–3 to 1.

It should be noted that the terms catalyst and catalyst systems are not used in the strict sense as it is apparent that a significant portion of the metal moiety in the catalyst is actually participating in the reaction and becoming part of the final polymeric product.

In order to achieve the crosslinkable polymers of this invention, it is necessary that the polymerization be carried out in the temperature range of from 120 to 200° C. A more preferred temperature range is from 125 to 175° C. This temperature requirement is essential because it has been discovered that at polymerization temperatures of less than 120, no substantial amounts of metal halide are introduced into the polymer structures and crosslinking subsequently does not take place upon heating. At temperatures greater than 200° C. poor polymeric products are obtained because of competing reactions in the polymerization system.

EXAMPLE 11

This example is set forth to illustrate the preparation of a low molecular weight polymer wherein the degree of polymerization is about 10.

40.8 grams (0.24 mole) of diphenyl ether and 58.7 grams (0.16 mole) of 4,4′-oxydi(benzenesulfonyl chloride) are reacted for 15.5 hours at 145° C. using a molar ratio of aluminum chloride to sulfonyl chloride groups of 1.5 to 1. The general procedure of Example 2 is followed here.

The resulting polymer, which is comparable in structure to that polymer prepared in Example 2, has a degree of polymerization of about 10 due to the molar imbalance of reactants which allows only short segments to form.

EXAMPLE 12

This example is set forth to illustarte the preparation of a high molecular weight polymer wherein the degree of polymerization is over 100.

The reactants and general procedure of Example 2 is followed here except that no solvents are used and the polymerization reaction is carried out using melt polymerization techniques and a co-catalyst system comprising equimolar amounts of aluminum chloride and ferric chloride wherein the cocatalyst to sulfonyl chloride ratio is 1.5 to 1.

The resulting polymer has a degree of polymerization greater than 100.

In general, polymers prepared in accordance with the practice of this invention will have a degree of polymerization of from 5 to 300 units. Preferably, the polymers will have a degree of polymerization of from 10 to 200 and more preferably of from 10 to 150 units.

As is apparent from the foregoing examples, the amount of recurring polymer units which contain bound metal halide may be varied over a wide range by controlling the amount of catalyst, polymerization time and the reaction temperature. This invention contemplates polymers having an average of at least one recurring metal halide unit per chain.

In the case of polymers having a degree of polymerization of from 5 to 50 the requirement of at least one recurring metal halide unit per chain will correspond to an average minimum of from 20 to 2 molar percent of recurring metal halide unit per chain respectively. Also contemplated are homopolymers wherein each recurring unit contains bound metal halide.

The polymers of this invention may be prepared by solution, dispersion or bulk polymerization processes which are well known to those skilled in the art. The organic mediums which are suitable for carrying out the solution or dispersion polymerizations are any organic medium which is a liquid in the 40 to 200° C. temperature range and which is inert to both the reactants and products. Examples of suitable aliphatic compounds are mixtures of paraffins, saturated materials free of tertiary carbon atoms such as ligroin, etc. Suitable aromatic polymerization media (which are preferred) would include nitrobenzene and certain fluoro substituted nitrobenzenes which are inert to both the monomeric reactants and catalysts and are liquids in the specified temperature range.

The polymers of this invention are soluble in such materials as phenols, cresylic acids, N-methyl pyrrolidone, dimethylacetamide, pyridine, dimethylsulfoxide, nitrobenzene, etc. The preferred solvents are phenols, cresylic acids, N-methyl pyrrolidone and dimethylacetamide.

The polymers of this invention may be crosslinked by heating at temperatures greater than 200° C. for appropriate lengths of time. In general, crosslinking takes place more rapidly as the temperature is increased. As noted in the examples, crosslinking is substantially complete within 10 minutes at 300° C.

The polymers of this invention find special use in the surface coatings and electrical insulation field where resistance to high temperature and oxidative degradation is essential. The polymers of this invention also exhibit high temperature stability, i.e., 200 to 300° C. and insolubility in a variety of corrosive environments.

It should be apparent to those skilled in the art that many variations may be made in the products and processes described in this invention without departing from the scope thereof.

What is claimed is:

1. A solid crosslinkable polymer which is the polymerization reaction product of (1) a diphenyl methyl phosphine which corresponds to the following general structural formula:

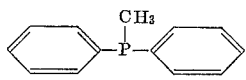
(I)

and (2) an aromatic disulfonyl halide which corresponds to the following general structural formula:

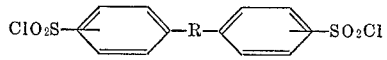
(II)

wherein R is a bivalent radical selected from the group consisting of oxygen, sulfur, monoalkyl phosphine, selenium and —Si($R_1$)$_2$; wherein $R_1$ is an alkyl of from 1 to 3 carbon atoms; wherein the polymerization reaction is carried out at temperatures of from 125 to 200° C. In the presence of a catalyst selected from the group consisting of aluminum halide, and aluminum halide co-catalyst systems wherein the co-catalyst is selected from the group consisting of ferric halide, boron trihalide, stannic halide, and phosphorous trihalide and wherein the molar ratio of catalyst to sulfonyl halide groups in Formula 11 above is greater than 1.05 to 1; and wherein the resulting polymer has a degree of polymerization of from 10 to 150 units which contain an average of at least one metal halide unit per polymer chain wherein the metal halide unit corresponds to the following general structural formula:

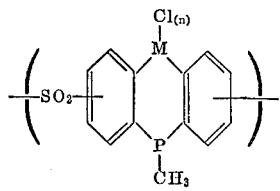

wherein M is a metal selected from the group consisting of aluminum, iron (III), boron, phosphorous (III), tin (IV); and $n$ is an integer of from 1 to 2.

2. A polymer as in claim 1 wherein R is sulfur.
3. A polymer as in claim 1 wherein M is tin or aluminum.
4. A crosslinked polymer polymeric composition which is obtained by curing the polymeric composition of claim 1 at temperatures of at least 200° C.

References Cited

UNITED STATES PATENTS

| | | | |
|---|---|---|---|
| 3,321,449 | 5/1967 | Vogel | 260—79.3 |
| 3,406,149 | 10/1968 | Vogel | 260—49 |

FOREIGN PATENTS

| | | |
|---|---|---|
| 1,016,245 | 1/1966 | Great Britain. |
| 927,822 | 6/1963 | Great Britain. |

OTHER REFERENCES

Brewster et al., Organic Chemistry, 3rd edition, 1961, p. 534.

JAMES A. SEIDLECK, Primary Examiner

U.S. Cl. X.R.

117—161; 260—30.2, 30.8. 32.6, 33.4, 49